United States Patent [19]

Hoshizaki et al.

[11] Patent Number: 4,652,727

[45] Date of Patent: Mar. 24, 1987

[54] CERAMIC HEATER AND A PROCESS FOR PRODUCING THE SAME

[75] Inventors: Hiroki Hoshizaki, Anjo; Hirofumi Suzuki; Terutaka Kageyama, both of Kariya; Kazuo Oyobe, Obu, all of Japan

[73] Assignee: Nippondenso Co., Ltd., Kariya, Japan

[21] Appl. No.: 791,523

[22] Filed: Oct. 25, 1985

[30] Foreign Application Priority Data

Oct. 26, 1984 [JP] Japan .................. 59-226291

[51] Int. Cl.⁴ .................. H05B 3/08; H01C 7/04
[52] U.S. Cl. .................. 219/541; 29/612
[58] Field of Search .................. 219/541, 543; 29/611, 29/612, 621

[56] References Cited

U.S. PATENT DOCUMENTS

| | | | |
|---|---|---|---|
| 3,067,310 | 12/1962 | Walz et al. | 219/541 |
| 3,266,661 | 8/1966 | Dates | 219/543 X |
| 3,775,843 | 12/1973 | Wenot | 29/612 |
| 4,385,226 | 5/1983 | Sauer | 219/541 X |
| 4,449,039 | 5/1984 | Fukazawa et al. | 219/553 |

Primary Examiner—Donald A. Griffin
Attorney, Agent, or Firm—Cushman, Darby & Cushman

[57] ABSTRACT

The ceramic heater of the present invention is used as a regenerating heater for a carbon particulate collecting filter. The ceramic heater comprises a heat-generating body composed of a sintered body which comprises an electroconductive ceramic, such as titanium nitride, and an insulating material, such as silicon nitride. An electroconductive layer is formed on a selected portion of the surface of the heat-generating body. The ratio of the electroconductive ceramic ingredient of the electroconductive layer is greater than the ratio of the electroconductive ceramic ingredient of the heat-generating body. The electroconductive layer of the ceramic heater is formed by partially heat-decomposing silicon nitride.

13 Claims, 8 Drawing Figures

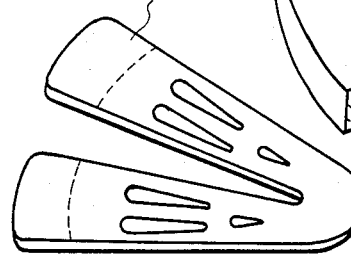
FIG.7
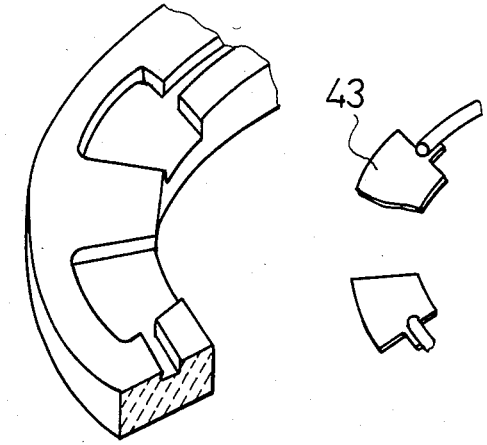
FIG.8
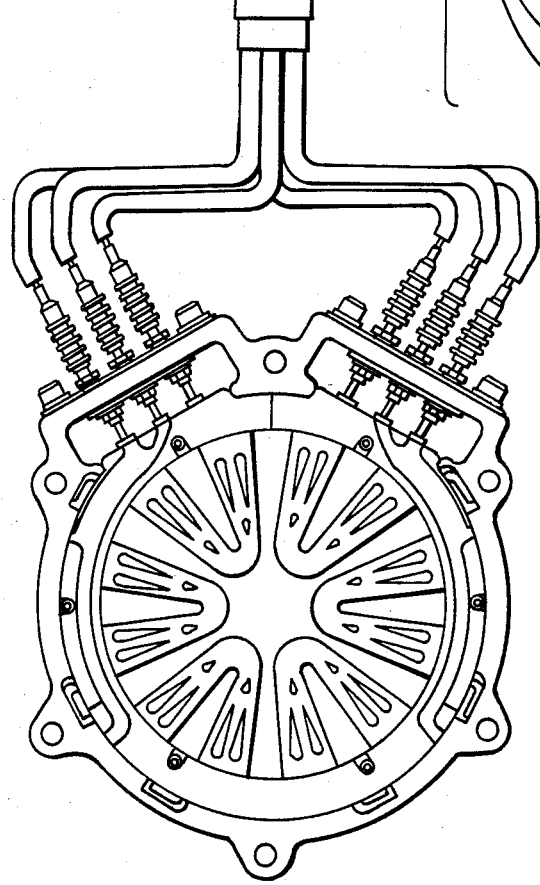

CERAMIC HEATER AND A PROCESS FOR PRODUCING THE SAME

BACKGROUND OF THE INVENTION

1. Field of the Invention

The present invention relates to an improved ceramic heater and a process for producing the same. The ceramic heater of the present invention has a heat-generating body composed of a sintered body which comprises, as the main ingredients, an electroconductive ceramic and an insulating material such as silicon nitride.

2. Description of the Prior Art

The use of metals and ceramics in the manufacture of heat-generating bodies is known in the art. Examples of metals which have been used in the manufacture of metal heat-generating bodies include nichrome, kanthal and the like. These materials, however, are poor in heat resistivity. Examples of ceramics which have been used in the manufacture of ceramic heat-generating bodies include silicon carbide, molybdenum disilicite, lanthanum chromate ($LaCrO_3$) and the like. However, the thermal shock resistivity and strength of these materials are insufficient. In addition, due to the high specific resistance of these materials, it is difficult to use them at a low voltage; for example, a voltage of 12 V, which is available from a car battery.

SUMMARY OF THE INVENTION

1. Object of the Invention

As the result of earnest study to overcome the foregoing problems of the prior art, the present inventors have found that a heat-generating body composed of a sintered body comprising, as the main ingredients, an electroconductive ceramic selected from at least one of titanium carbide, titanium nitride, molybdenum disilicide and the like, and an insulating material such as silicon nitride and the like is excellent in strength, thermal shock resistivity and heat resistivity.

A prior art ceramic heater described by Suzuki et al, U.S. patent application Ser. No. 640,985 (1984) has drawbacks, as stated below, in the electrode structure which supplies electric current to the heat-generating body.

The ceramic heater usually comprises a heat-generating ceramic body, a metallic layer composed of nickel, silver or the like and, formed on the surface of the heat-generating body by way of paste-baking or plating, a metal electrode disposed on the metallic layer, and a flux material layer for bonding together the metallic layer and the metal electrode. However, because the "wetting" property between the heat-generating body and the metal is poor in the ceramic heater, the bonding between the heat-generating body and the paste metal is insufficient upon paste-baking. Accordingly, problems such as peeling or a rise in resistivity occur between the heat-generating body and the baked metal. Furthermore, because the heat-generating body to be bonded with the metallic layer has a high specific resistivity, heat is generated at the periphery of the electrode, which reduces the service life of the ceramic heater at high temperatures.

Furthermore, when the electrode plate is applied to the heat-generating body where no metallic layer is disposed, heat is generated at the periphery of the electrode which reduces the service life of the ceramic heater at high temperatures.

The present invention has been achieved in order to overcome the foregoing problems. An object of the present invention is to provide a ceramic heater which has (1) an improved service life at high temperatures by suppressing the heat generation at the periphery of the electrode, (2) good bonding between the heat-generating body and the metallic layer to reduce the possibility of peeling and a rise in resistivity between the heat-generating body and the metallic layer, and (3) the capacity to work at a low voltage. Another object of the present invention is to provide a process capable of producing the ceramic heater.

2. Elements of the Invention

The ceramic heater of the present invention has a heat generating body composed of a sintered body which comprises, as the main ingredient, an electroconductive ceramic selected from at least one of nitrides of titanium and like metals, carbides of these metals and molybdenum disilicide, and an insulating material selected from at least one of silicon nitride, silicon carbide and aluminum oxide ($Al_2O_3$), as well as an electroconductive layer formed on a portion of the surface of the heat-generating body. The electroconductive layer comprising, as the essential ingredient, an electroconductive ceramic selected from at least one of nitrides of titanium and like metals, carbides of these metals and molybdenum disilicide. According to the present invention, the ratio of the electroconductive ceramic ingredient in the electroconductive layer is greater than the ratio of the electroconductive ceramic ingredient in the heat-generating body.

The ceramic heater of the present invention is constructed according to the three steps described below.

In the first step, a powder mixture is prepared by mixing the powder of an electroconductive ceramic selected from at least one of nitrides of titanium and like metals, carbides of these metals and molybdenum disilicide, and the powder of an insulating material selected from at least one of silicon nitride, silicon carbide and aluminum oxide ($Al_2O_3$).

According to the second step, the powder mixture is molded to obtain a ceramic molding product which is subsequently sintered to form a ceramic sintered body.

The third step consists of forming, on a selected portion of the surface of the ceramic sintered body, an electroconductive layer which comprises, as the main ingredient, an electroconductive ceramic selected from at least one of nitrides of titanium and like metals, carbides of these metals and molybdenum disilicide. According to the present invention, the ratio of the electroconductive ceramic ingredient in the electroconductive layer is greater than the ratio of the electroconductive ceramic ingredient in the ceramic sintered body.

In the third step, the electroconductive layer is preferably formed by one of two methods as described below.

According to one method, the ceramic molding product of step two is sintered to at least partially heat-decompose the silicon nitride or silicon carbide at the surface of the ceramic sintered body. The heat-decomposing product evaporates to form a porous surface layer in which the ratio of the electroconductive ceramic ingredient is greater than the ratio of the electroconductive ceramic ingredient of the ceramic sintered body. The surface layer is then polished with the exception of a selected portion thereof which forms a porous electroconductive layer at that portion of the surface of the ceramic sintered body.

Alternatively, a paste composed of an active metal powder is coated on a selected portion of the surface of the ceramic sintered body to heat-decompose at least a portion of the silicon nitride or silicon carbide at that portion of the surface of the ceramic sintered body. The heat-decomposing product evaporates to form a porous electroconductive layer on the selected portion of the surface of the ceramic sintered body.

The preferred embodiments of the present invention are illustrated in detail in the accompanying drawings.

BRIEF DESCRIPTION OF THE DRAWINGS

FIG. 7 is a perspective view representing an alternate embodiment of a ceramic heater manufactured according to the method of the present invention including assembled state of the ceramic heater.

FIG. 8 is a plan view of a heating device with ceramic heaters.

DETAILED DESCRIPTION OF THE INVENTION

1. The Ceramic Heater

Figure 1:
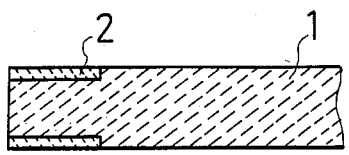
FIG. 1 represents a longitudinal sectional view of a portion of one embodiment of a ceramic heater manufactured according to the method of the present invention, said ceramic heater comprising a heat-generating body and an electroconductive layer.

The ceramic heater of the present invention has a heat generating body composed of a sintered body which comprises, as the main ingredient, an electroconductive ceramic selected from at least one of nitrides of titanium (Ti), zirconium (Zr), hafnium (Hf), vanadium (V), niobium (Nb), tantalum (Ta), chromium (Cr), molybdenum (Mo), tungsten (W) and lanthanum (La), carbides of these metals and molybdenum disilicide, and an insulating material selected from at least one of silicon nitride, silicon carbide and aluminum oxide ($Al_2O_3$), and an electroconductive layer formed on a portion of the surface of the heat-generating body which comprises, as the main ingredient, an electroconductive ceramic selected from at least one of nitrides of titanium (Ti), zirconium (Zr), hafnium (Hf), vanadium (V), niobium (Nb), tantalum (Ta), chromium (Cr), molybdenum (Mo), tungsten (W) and lanthanum (La), and carbides of these metals and molybdenum disilicide. According to the present invention, the ratio of the electroconductive ceramic ingredient in the electroconductive layer is greater than the ratio of the electroconductive ceramic ingredient in the heat generating body.

A. The Heat-Generating Body

The heat-generating body, a constituent component of the ceramic heater of the present invention, is composed of a sintered body which comprises, as the main ingredients, electroconductive ceramics selected from at least one of the nitrides of Ti, Zr, Hf, V, Nb, Ta, Cr, Mo, W and La, carbides of these metals and molybdenum disilicide ($MoSi_2$), and an insulating material selected from at least one of silicon nitride ($Si_3N_4$), silicon carbide (SiC) and aluminum oxide ($Al_2O_3$).

The electroconductive ceramic may comprise, for example, at least one or two more of titanium nitride (TiN), zirconium nitride (ZrN, chromium nitride (CrN), tungsten nitride (WN), titanium carbide (TiC), zirconium carbide (ZrC) and the like. An electroconductive ceramic comprising at least one of titanium nitride and titanium carbide is preferred. The service life of a ceramic heater comprising at least one of the materials at high temperatures is excellent because the mechanical strength of the ceramic heat-generating body at high temperature is large and the heat resistance is excellent.

Further than ensuring the capacity of the heat-generating body to produce heat, there is no particular restriction regarding the ratio of the electroconductive ceramic ingredient comprising in the heat-generating body. Preferably, however, the ratio of the electroconductive ceramic ingredient ranges from 10 to 80 mol% based on 100 mol% of the entire body. The specific resistance of the sintered body of the heat-generating body may be adjusted by controlling the content of the electroconductive ceramic within the range specified above.

The insulating material comprises at least one of silicon nitride, silicon carbide and $Al_2O_3$. Ceramics of silicon nitride are generally excellent in strength, thermal shock resistance and heat-resistance. The insulating material may also include SIALON, which is composed of silicon nitride and $Al_2O_3$.

As described above, the heat-generating body is composed of a sintered body which comprises an electroconductive ceramic and an insulating material. The term "main ingredient" as used herein describes those ingredients which are constituent parts of the heat-generating body; however, no significant meaning regarding the content thereof is implied. The heat-generating body may contain, in addition to the above-described ingredients, yttrium oxide ($Y_2O_3$), magnesium oxide (MgO), aluminum oxide ($Al_2O_3$), silicon dioxide ($SiO_2$), aluminum magnesium oxide ($MgAl_2O_3$) and the like. While there is no particular restriction on the amount added additional ingredients are preferably added in the range of, approximate, 3 to 15 mol% based on 100 mol% of the entire body.

There is no specific restriction for the particle size of the insulating material, electroconductive ceramic and the like, beyond the requirement that a sintered body is produced upon sintering. The preferred particle size is in the range of from 0.1 to 50 μm for silicon nitride and from 0.1 to 4 μm for the electroconductive ceramic, because a heat-generating body with low resistance may be obtained with a particle size in this range.

Figure 5:
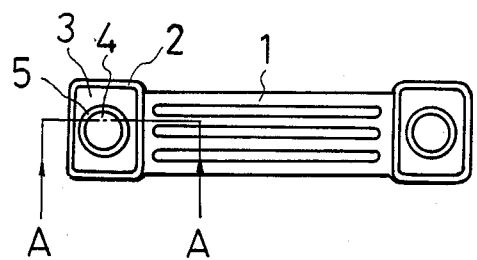
FIG. 5 is a plan view of an embodiment of a ceramic heater manufactured according to the method of the present invention.
Figure 6:
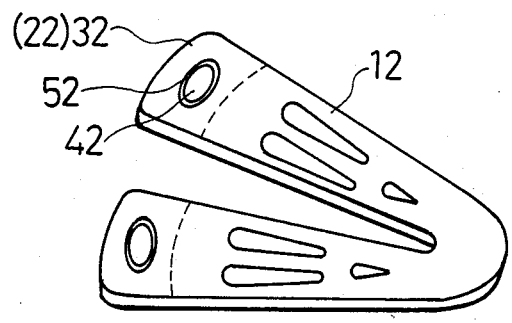
FIG. 6 is a perspective view of an alternate embodiment of a ceramic heater manufactured according to the method of the present invention.

The configuration of the heat-generating body has no particular restriction and various shapes may optionally be selected depending on the ultimate purpose and use of the produced heat-generating body. For instance, as shown in FIG. 5, it may be formed into a rectangular shape 1 having inner gaps; alternatively, as shown in FIG. 6, it may be formed into a fan-like shape 12 with two legs having internal gaps.

B. The Electroconductive Layer

A second constituent element of the ceramic heater is the electroconductive layer which is formed on a selected portion of the surface of the heat-generating body and which comprises as the main ingredient, an electroconductive ceramic selected from at least one of titanium nitride, titanium carbide, molybdenum disilicide and the like, as described above. The ratio of the electroconductive ceramic ingredient of the electroconductive layer is greater than the ratio of the electroconductive ceramic ingredient of the heat-generating body.

The electroconductive ceramic of the electroconductive layer may comprise at least one of the materials described above. Furthermore, the material of the electroconductive ceramic may be identical with or different from the material of the electroconductive ceramic of the heat-generating body. Identical material is preferred, because the bonding strength between the heat-generating body and the electroconductive layer is thereby enhanced.

The electroconductive ceramic of the electroconductive layer preferably comprises at least one of titanium nitride and titanium carbide. Because the electroconductive ceramic constituting the heat-generating body is preferably selected from at least one of titanium nitride and titanium carbide, it is preferred that the electroconductive ceramic of the electroconductive layer also be selected from materials identical with or similar to these materials.

It is sufficient that at least one electroconductive ceramic is used as the main ingredient of the electroconductive layer. In other words, the electroconductive layer may additionally contain a material such as silicon nitride or the like which constitutes the heat-generating body. It is, however, necessary that the ratio of the electroconductive ceramic ingredient of the electroconductive layer be greater than the ratio of the electroconductive ceramic ingredient of the heat-generating body. The ratio of the electroconductive ceramic ingredient of the electroconductive layer is approximately 50 to 100 mol% based on 100 mol% of the entire body. With the ratio of the electroconductive ceramic ingredient of the electroconductive layer greater than the ratio of the electroconductive ingredient of the heat-generating body, strong bonding is obtained between the electroconductive layer and the metallic layer because a good wetting is obtained between both these layer. Accordingly, less peeling occurs between the layers. Furthermore, heat generation at the periphery of the electrode is also prevented.

Figure 2:
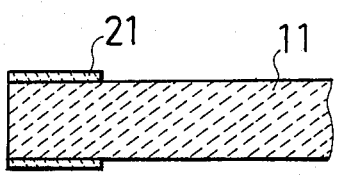
FIG. 2 is a longitudinal sectional view of a portion of an alternate embodiment of a ceramic heater manufactured according to the method of the present invention, said ceramic heater comprising a heat-generating body and an the electroconductive layer.

There is no particular restriction an the location where the electroconductive layer is formed, with the exception that it should be formed on that portion of the surface of the heat-generating body on which there is disposed the metallic layer formed on the metal electrode. For instance, it may be formed at the end of the heat-generating body 1 at the four upper and lower surface positions, as shown in FIG. 1. Furthermore, it may be formed in such a manner that the electroconductive layer 2 and each adjacent surface of the heat-generating body is co-planar, as shown in FIG. 1. Alternatively, the electroconductive layer 21 may be formed above the surface of the heat generating body, as shown in FIG. 2.

While the electroconductive layer may be porous or nonporous, a porous layer is preferred. Since bonding between the porous surface and the metal is further increased with a porous electroconductive layer, peeling between the heat generating body and the metallic layer is more effectively prevented in the ceramic heater. The term "porous" as usual herein with reference to an electroconductive layer describes an extent of porosity greater than the porosity of an electroconductive layer formed through either a CVD or a PVD process. More specifically, the average porosity of the electroconductive layer in the ceramic heater is approximately 2 to 20 vol.%, and the average thickness of the electroconductive layer is approximately 0.01 to 0.5 mm.

C. The Metallic Layer and The Metal Electrode

A metallic layer is formed on the surface of the electroconductive layer. The material for the metallic layer is not restricted; those materials usually employed may be used. Furthermore, the metallic layer is preferably formed to substantially cover the entire surface of the electroconductive layer, so that high temperature oxidation of the electroconductive layer or the heat-generating body is prevented.

Metal electrodes may be disposed on the surface of the metallic layer. The materials for the metal electrode are not limited; those materials usually employed may be used. The metal electrode may be shaped, for example, as shown at 4 in FIG. 4 so as to fit against the end of the heat-generating body 1, or it may be shaped as an electrode plate 43 bonded with a lead wire, as shown in FIG. 7.

Figure 4:
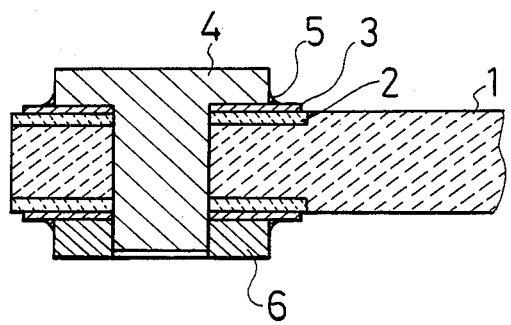
FIG. 4 is a longitudinal sectional view taken along line A—A of FIG. 5.

As shown in FIG. 4, a flux layer 5 may be formed in such a way as to bond together the metallic layer 3 and the metal electrode 4. While there is no particular restriction on the material which may be used for the flux layer 5, copper or a similar heat-resistant material is usually employed.

The electroconductive layer, with a specific resistivity which is smaller than the specific resistivity of the heat-generating body, is bonded with the metallic layer or the metal electrode in the ceramic heater.

Accordingly, in the ceramic heater, heat generation at the periphery of the electrode is reduced and the service life at high temperatures is improved. Furthermore, since the wetting property is satisfactory between the electroconductive layer and the metal (for example, the metallic layer), good bonding is obtained and peeling or a rise in resistivity is prevented between the ceramic body and the metal, i.e., the metallic layer.

The heat-generating body of the ceramic heater is composed of a sintered body which comprises an insulating material, such as silicon nitride, and an electroconductive ceramic as the main ingredients. Accordingly, the ceramic heater is remarkably excellent in thermal shock resistivity, strength and heat resistivity, in comparison with a ceramic heater which comprises silicon carbide, molybdenum disilicide or the like.

As described above, the ceramic heater is very useful as a regenerating heater for carbon particulate collecting filters which are continuously exposed to exhaust gases at the high temperature of 800° C.

2. The Process Of Producing The Ceramic Heater

The process of producing the ceramic heater according to the present invention comprises a first step of preparing a powder mixture by mixing the above-described powder of the electroconductive ceramic composing the heat-generating body and the above-described powder of the insulating material composing the heat-generating body;

a second step of molding the powder mixture prepared in the first step and sintering the obtained ceramic molding product to form a ceramic sintered body; and a third step of forming, on a portion of the surface of the ceramic sintered body an electroconductive layer comprising, as the main ingredient, the above-described electroconductive ceramic composing the electroconductive layer of the ceramic heater. The ratio of the electroconductive ceramic ingredient of the electroconductive layer is greater than the ratio of the electroconductive ceramic ingredient of the ceramic sintered body.

In the first step, the powder mixture is prepared by mixing the powder of the electroconductive ceramic and the powder of an insulating material, such as silicon nitride and the like. The terms "electroconductive ceramic" and "silicon nitride and the like" have the same meanings as in Section 1 above, describing the ceramic heater. While there is no particular restriction regarding the configuration of these powders, those having the particle size described in Section 1 are preferred. The powder mixture may be mixed and prepared according to any customary method.

In the second step, the powder mixture prepared in the first step is molded and the ceramic molding product obtained is sintered to form a ceramic sintered body. The method of molding the powder mixture and the method of forming the ceramic sintered body undergo no particular restriction and may be practiced by customary methods.

In the third step, an electroconductive layer which comprises the above-described electroconductive ceramic as the main ingredient, in which electroconductive layer the ratio of the electroconductive ceramic ingredient is greater than the ratio of the electroconductive ceramic ingredient of the ceramic sintered body, is formed on a portion of the surface of the ceramic sintered body, which is formed in the second step. The terms "electroconductive ceramic" and "main ingredient" as used herein have the same meanings as in Section 1 above, describing the ceramic heater.

While the electroconductive layer may be porous or not, a porous layer is preferred. The porous electroconductive layer may be formed according to two methods, as described below.

A method of forming a porous electroconductive layer, referred to here as Method A, comprises sintering the ceramic molding product formed in the second step to at least partially heat-decompose the silicon nitride or silicon carbide at the surface of the ceramic sintered body. The heat-decomposing product evaporates to form a porous surface layer in which the ratio of the electroconductive ceramic ingredient is greater than the ratio of the electroconductive ceramic ingredient of the sintered body. The surface layer is then polished with the exception of a selected portion thereof to form a porous electroconductive layer at that portion of the surface of the ceramic sintered body.

This is a method of forming a porous surface layer by heating the surface of the ceramic sintered body and polishing a portion thereof to form the electroconductive layer. Heat decomposition of the silicon nitride or silicon carbide may be effected either entirely or partially to the silicon carbide composing the surface portion. The electroconduc-tive layer consists only of the electroconductive ceramic in the former, while the electroconductive layer contains silicon nitride or silicon carbide on a portion thereof in the latter. The former is preferred to prevent heat generation at the periphery of the electrode. According to this method, the electroconductive layer 21 is formed on the surface of the heat-generating body 11 as shown FIG. 2.

An alternate method of forming a porous surface layer, referred to here as Method B, comprises coating a paste composed of an active metal powder on a portion of the surface of the ceramic sintered body, and heating to a temperature in the range of from 1400° to 1700° C. to at least partially heat-decompose the silicon nitride or silicon carbide at the surface of the ceramic sintered body. The heat-decomposing product evaporates to form a porous electroconductive layer on that portion of the surface of the ceramic sintered body. With this method, the catalytic effect of the selected active metal is utilized.

Platinum, nickel or the like is used as the active metal. According to this method, the surface grinding required by Method A is not required and an electroconductive layer may be formed where the active metal is coated. Since the powder of the active metal is present as it is following the formation of the electroconductive layer on the surface thereof, it is usually used as it is for the ceramic heater, or it is directly transferred to the subsequent step of forming the metallic layer. As shown in FIG. 1, in the electroconductive layer formed by this method, the surface of the electroconductive layer and the surface of the heat-generating body not formed with the electroconductive layer are made co-planar.

Methods A and B, described above, have the features that (1) a porous electroconductive layer is formed, (2) the electroconductive ceramic contained in the heat-generating layer and the electroconductive ceramic contained in the electroconductive layer are composed of the same material, and (3) the skeleton of the electroconductive layer and that of the heat-generating layer connected therewith are continuous. Accordingly, the ceramic heater produced by either Method A or Method B of the present invention has significantly strong bonding between the electroconductive layer and the metallic layer as well as between the electroconductive layer and the heat-generating body. Accordingly, Methods A and B of the present invention produce a ceramic heater in which peeling of the metallic layer from the electroconductive layer, as well as peeling of the electroconductive layer from the heat-generating body are effectively prevented.

A CVD or PVD process may be employed in forming a non-porous electroconductive layer composed of titanium nitride or titanium carbide. The PVD process includes vacuum vapor deposition, ion-plating, sputtering and the like.

Following completion of the third step of the process of producing a ceramic heater according to the present invention, a further step may be added to form a metallic layer on the surface of the electroconductive layer which is formed in the third step. There is no particular restriction on the method employed to form the metallic layer and those materials usually employed may be used. Furthermore, the metallic layer is usually baked in an inert or reducing gas atmosphere in order to prevent the oxidation of the heat-generating body and the electroconductive layer.

Following the completion of the step wherein the metallic layer is formed, a further step may be added wherein the metal electrode is attached to the surface of the metallic layer. There are no particular restrictions on either the method or the material employed to attach the metal electrode to the surface of the metallic layer.

A flux layer may be formed to bond together the metallic layer and the metal electrode. Again, there are no particular restrictions on either the method or the material used in forming the flux layer.

In summary, the production process of the ceramic heater of the present invention comprises a first step of preparing a powder mixture, a second step of forming a ceramic sintered body and a third step of forming, on a selected portion of the surface of the ceramic sintered body, an electroconductive layer comprising, as the main ingredient, an electroconductive ceramic selected from at least one of titanium nitride and the like. The ratio of the electroconductive ceramic ingredient of the electroconductive layer is greater than the ratio of the electroconductive ceramic ingredient of the ceramic sintered body.

In accordance with the process of production of the present invention, a ceramic heater having the advantageous merits as described above is produced.

The present invention is illustrated in detail in the following preferred examples.

EXAMPLE 1

The Production Process for a Ceramic Heater (A) The Preparation of a Ceramic Sintered Body Silicon nitride with an average particle size of 0.8 $\mu$m and titanium nitride with an average particle size of 0.5 $\mu$ were each weighed to predetermined amounts to prepare a powder mixture with a composition of 41 mol% of silicon nitride and 55.4 mol% of titanium nitride. The mixed powder also contained sintering aids composed of 2.2 mol% of $MgAl_2O_4$ and 1.4 mol% of $Y_2O_3$. The powder mixture was poured into water as a solvent and mixed for 12 hours. The powder mixture thus immersed and mixed was then dried and pelletized. The pellets were subsequently press-molded to a predetermined size and sintered at 1750° C. for 4 hours in a nitrogen atmosphere to form a sintered body.

(B) Preparation of The Porous Electroconductive Layer

A paste composed of platinum powder was coated at four positions, on both ends of the upper and lower surfaces of the ceramic sintered body formed as described above, and heated to a temperature from 1400° C. to 1800° C. Silicon nitride at the surface was heat-decomposed by the catalytic action of platinum. The heat-decomposing product evaporated to leave a porous electroconductive layer on a predetermined surface of the ceramic sintered body.

(C) Preparation of the Metallic Layer

Figure 3:
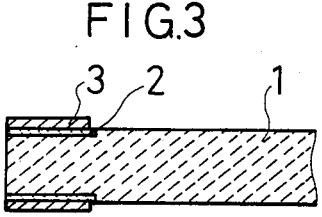
FIG. 3 is a longitudinal sectional view of a portion of a ceramic heater comprising a heat-generating body, an electroconductive layer and a metallic layer formed on a portion of the surface of the electroconductive layer.

As shown in FIG. 3, a platinum layer was baked on the electroconductive layer 2 formed as described above, in an inert gas at a temperature of 1200° C. to 1400° C. to form a metallic layer 3 on the electroconductive layer.

(D) The Disposition and Securing of the Metal Electrode

As shown in FIG. 4 and FIG. 5, a metal electrode 4 was disposed on a portion of the surface of a metallic layer 3 formed as described above. The metal electrode 4 and the metallic layer 3 were brazed using a flux material (nickel) to form a flux layer 5.

EXAMPLE 2

The Structure and Performance of the Ceramic Heater

A ceramic heater was prepared as described above in Example 1 comprising a heat-generating body 1 composed of a sintered body comprising 55.4 mol% of titanium nitride and 41 mol% of silicon nitride; a porous electroconductive layer 2 formed on a portion of the surface of the heat-generating body 1 and comprising titanium nitride, $MgAl_2O_4$ and $Y_2O_3$; a metallic layer 3 covering substantially the entire surface of the electroconductive layer 2; a metal electrode (bolt-like metal electrode) 4 disposed on the surface of the metallic layer 3 and secured by means of bolts 4 and nuts 6 engaged with the bolts 4; and a flux material layer 5 for brazing the metallic layer 3 and the metal electrode 4.

As a comparative example, a ceramic heater was prepared in the same manner as in Example 1, with the exception that the ceramic heater did not comprise an electroconductive layer.

The performance of the ceramic heater according to this example was compared with that of the ceramic heater of the comparative example. The results of the performance are shown in the following table. To determine performance, the specific resistivity of the heat-generating body and of the electroconductive layer, as well as the baking property of the metallic layer were measured. The baking property was evaluated based on the occurrence of peeling on the ceramic heater following its production, the specific resistivity of the metallic layer following its fabrication, and the heat resistivity was based on the resistance value and the occurrence of peeling between the metallic layer and the metal electrode after heating for 200 hours at 800° C.

It may be seen from the following table that (1) the specific resistivity of the electroconductive layer was lower than that of the heat-generating body, (2) while partial peeling occurred upon baking the ceramic heater in the comparative example, no peeling occurred in the ceramic heater prepared according to this example, (3) the specific resistivity of the metallic layer was lower in ceramic heater of this example compared with that in the ceramic heater of the comparative example, and (4) while peeling occurred and electroconduction became poor after 200 hours in the ceramic heater of the comparative example, no peeling occurred in the ceramic heater of the example and the resistance value only decreased from 0.2 ohm to 0.05 ohm measured at 800° C. after the elapse of 200 hours, in the evaluation of the heat resistant property. Accordingly, the ceramic heater of the example had stronger bonding between the ceramic and the metallic layer than the ceramic heater of the comparative example and neither peeling nor a rise in the resistance occurred. In addition, since the specific resistivity of the electroconductive layer was lower as compared with that of the heat-generating body, heat generation at the periphery of the electrode can be reduced, and the service life of the ceramic heater under high temperature can be increased in the ceramic heater prepared according to this example.

EXAMPLE 3

Further Examples of the Ceramic Heater

As shown in FIG. 6, the ceramic heater of the present invention may be composed of a heat-generating body 12 of a fan-like shape with two legs having internal gaps, a porous electroconductive layer 22 formed on the two-end portions of the surface of the two legs of the heat-generating body 12, a metallic layer 32 formed so as to cover substantially the entire surface of the electroconductive layer 22, a metal electrode 42 disposed on the surface of the metallic layer 32, and a flux material layer 52 for brazing the metallic layer 32 and the metal electrode 42.

Furthermore, as shown in FIG. 7, the ceramic heater of the present invention may be composed of a heat-generating body 13 of a fan-like shape with two legs having internal gaps, a porous electroconductive layer 23 formed on the two-end portions of the surface of the two legs of the heat-generating body 13, a metallic layer 33 formed so as to cover substantially the entire surface of the electroconductive layer 23, and an electrode plate 43 bonded with a lead wire disposed on the surface of the metallic layer 33.

As shown in FIG. 8, a heating device for carbon particulate collecting filter may comprise the six ceramic heaters of the present invention.

TABLE

| Item for estimation | Example | Comparative Example |
|---|---|---|
| Specific resistivity of heat-generating body ($\Omega \cdot cm$) | $5 \times 10^{-3}$ | $5 \times 10^{-3}$ |
| Specific resistivity of electroconductive layer ($\Omega \cdot cm$) | $2.5 \times 10^{-5}$ | — |
| Baking property of metallic layer | | |
| (1) Peeling | None | partially peeled |
| (2) Specific resistivity of metallic layer ($\Omega \cdot cm$) | $7.5 \times 10^{-5}$ | $2.5 \times 10^{-4}$ |
| (3) Heating resistivity (800° C.) before heating after heating 200 hours | $0.02\Omega$ $0.05\Omega$ | $0.05\Omega$ peeling resulted, poor electroconductivity |

What is claimed is:

1. A ceramic heater having a heat-generating body composed of a sintered body comprising, as the main ingredient, an electroconductive ceramic selected from at least one of nitrides of titanium (Ti), zirconium (Zr), hafnium (Hf), vanadium (V), niobium (Nb), tantalum (Ta), chromium (Cr), molybdenum (Mo), tungsten (W) and lanthanum (La), carbides of these metals and molybdenum disilicide, and an insulating material selected from at least one of silicon nitride, silicon carbide and aluminum oxide ($Al_2O_3$), and
an electroconductive layer, formed on a portion of the surface of the heat-generating body and comprising, as the main ingredient, an electroconductive ceramic selected from at least one of nitrides of titanium (Ti), zirconium (Zr), hafnium (Hf), vanadium (V), niobium (Nb), tantalum (Ta), chromium (Cr), molybdenum (Mo), tungsten (W) and lanthanum (La), carbides of these metals and molybdenum disilicide, in which
the ratio of the electroconductive ceramic ingredient in the electroconductive layer is greater than the ratio of the electroconductive ceramic ingredient constituting the heat-generating body, and the specific resistance of the electroconductive layer is smaller than the specific resistance of the heat-generating body.

2. The ceramic heater according to claim 1, wherein the electroconductive ceramic constituting the heat-generating body is selected from at least one of titanium nitride and titanium carbide and the insulating material constituting the heat-generating body includes silicon nitride or silicon carbide, and
the electroconductive ceramic constituting the electroconductive layer is selected from at least one of titanium nitride and titanium carbide.

3. The ceramic heater according to claim 2, wherein the electroconductive layer is porous.

4. The ceramic heater according to claim 2, wherein the ratio of the electroconductive ceramic ingredient in the heat-generating body is from 10 to 80 mol% based on 100 mol% of the entire body.

5. The ceramic heater according to claim 2, wherein the electroconductive ceramic constituting the heat-generating body and the electroconductive ceramic constituting the electroconductive layer are made of the same electroconductive ceramic.

6. The ceramic heater according to claim 2, wherein a metallized layer is formed on the surface of the electroconductive layer.

7. The ceramic heater according to claim 1, wherein a metallized layer is formed on the surface of the electroconductive layer.

8. The ceramic heater according to claim 7, wherein a metal electrode is disposed on the surface of the metallized layer.

9. A process for producing a ceramic heater which comprises:
a first step of preparing a powder mixture by mixing a powder of an electroconductive ceramic selected from at least one of nitrides of titanium (Ti), zirconium (Zr), hafnium (Hf), vanadium (V), niobium (Nb), tantalum (Ta), chromium (Cr), molybdenum (Mo), tungsten (W) and lanthanum (La), carbides of these metals and molybdenum disilicide and a powder of an insulating material selected from at least one of silicon nitride, silicon carbide and aluminum oxide ($Al_2O_3$),
a second step of molding the powder mixture prepared in the first step and sintering the resultant ceramic molding product to form a ceramic sintered body, and
a third step of forming, on a portion of the surface of the ceramic sintered body formed in the second step, an electroconductive layer comprising, as the main ingredient, an electroconductive ceramic selected from at least one of nitrides of titanium (Ti), zirconium (Zr), hafnium (Hf), vanadium (V), niobium (Nb), tantalum (Ta), chromium (Cr), molybdenum (Mo), tungsten (W) and lanthanum (La), carbides of these metals and molybdenum disilicide, in which electroconductive layer, the ratio of the electroconductive ceramic ingredient is greater than the ratio of the electroconductive ceramic ingredient constituting the ceramic sintered body, and the specific resistance of the electroconductive layer is smaller than the specific resistance of the ceramic sintered body.

10. The process for producing the ceramic heater according to claim 9, wherein the heat-generating body is a sintered body comprising at least one of titanium nitride and titanium carbide and silicon nitride or silicon carbide in the second and the third steps and the process comprises:
sintering the ceramic molding product formed in the second step in order to at least partially heat-decompose silicon nitride or silicon carbide at the surface of the ceramic sintered body, evaporating the heat-decomposing product to form a porous surface layer in which the ratio of the electroconductive ceramic ingredient is greater than the ratio of the electroconductive ceramic ingredient constituting the sintered body and, thereafter, polishing the surface layer with the exception of a portion of the surface layer to form a porous electroconductive layer on the portion of the surface of the ceramic sintered body.

11. The process for producing the ceramic heater according to claim 9, wherein the electroconductive ceramic contained in the ceramic sintered body is at least one of titanium nitride and titanium carbide in the third step, and the process comprises:

coating a paste comprising an active metal powder comprising platinum or nickel on a portion of the surface of the ceramic sintered body, heating to a temperature of from 1400° C. to 1700° C. in order to at least partially heat-decompose silicon nitride or silicon carbide at the surface, and evaporating the heat-decomposing product to form a porous electroconductive layer on a portion of the surface of the ceramic sintered body.

12. The process for producing the ceramic heater according to claim 9, 10 or 11, wherein a step of forming a metallized layer on the surface of the electroconductive layer formed in the third step is further provided, subsequent to the third step.

13. The process for producing the ceramic heater according to claim 12, wherein a step of attaching a metal electrode to the surface of the metallized layer is further provided, subsequent to the step of forming the metallized layer on the surface of the electroconductive layer.

* * * * *